United States Patent

Lefevre et al.

[11] Patent Number: 6,059,242
[45] Date of Patent: May 9, 2000

[54] FIXING DEVICE FOR ELECTRICAL CONDUIT

[75] Inventors: René Lefevre, Chevigny-Saint-Sauveur; Paul Milliere, Varois et Chaignot, both of France

[73] Assignee: Schneider Electric SA, Boulogne Billancourt, France

[21] Appl. No.: 09/002,718

[22] Filed: Jan. 6, 1998

[30] Foreign Application Priority Data

Jan. 10, 1997 [FR] France .................................. 97 00365

[51] Int. Cl.⁷ .................................................. E04G 3/00
[52] U.S. Cl. ........................ 248/292.13; 248/292.14; 138/106
[58] Field of Search .................... 248/61, 72, 73, 248/74.1, 74.2, 316.6, 316.1, 316.5, 292.13, 292.14; 138/106; 174/138 R, 163 R; 24/517, 518

[56] References Cited

U.S. PATENT DOCUMENTS

| | | | |
|---|---|---|---|
| 419,642 | 1/1890 | Cornog | 174/163 R |
| 1,892,687 | 1/1933 | Teufel | 248/292.14 X |
| 3,388,881 | 6/1968 | Anderson | 248/74.3 |
| 5,354,030 | 10/1994 | Harwood | 248/316.1 |
| 5,622,347 | 4/1997 | Nourry | 248/316.5 |
| 5,716,035 | 2/1998 | Nourry et al. | 248/316.5 |

FOREIGN PATENT DOCUMENTS

| | | |
|---|---|---|
| 0 579 929 A1 | 1/1994 | European Pat. Off. . |
| 2 270 344 | 3/1994 | United Kingdom . |
| WO 89/12340 | 12/1989 | WIPO . |

Primary Examiner—Leslie A. Braun
Assistant Examiner—Gwendolyn Baxter
Attorney, Agent, or Firm—Oblon, Spivak, McClelland, Maier & Neustadt, P.C.

[57] ABSTRACT

A fixing device, notably for wall fixing, for profiled electrical conduit which includes a central part, a head and a foot intended respectively to be fitted by suitable shapes against a side wall and the upper and lower walls of the conduit envelope, characterised in that the head comprises a fixed part and a pivoting component pivotably mounted on the fixed part along an axis oriented along the length of the conduit, the pivoting component being intended to hook onto the upper wall of the conduit and to be locked by elastic mechanism.

12 Claims, 3 Drawing Sheets

6,059,242

FIXING DEVICE FOR ELECTRICAL CONDUIT

BACKGROUND OF THE INVENTION

1. Field of the Invention

This invention relates to a fixing device, notably for wall fixing, for a profiled electrical conduit that includes a central part, a head and a foot intended respectively to be fitted by suitable shapes against a side wall and the upper and lower walls of the conduit.

2. Discussion of the Background

The head and the foot of such a known fixing device for an electrical conduit of a rectangular section consist of two side pieces, an upper and lower, extending perpendicular to the central part and whose length is suitable for the width of the conduit in such a way that the fixing device can envelop the conduit. The retention of the fixing device in a position in which it holds the conduit is achieved by a connecting strip that extends along a side wall opposite to that wall against which the central part is applied and which is fixed by screwing to the free ends of the two side pieces.

The mounting of such a fixing device around the conduit is not, however rapid because of the assembly work required for the connecting strip.

Furthermore, the use of such a connecting strip for each fixing device does not leave free access to the whole of the side wall of the conduit situated alongside the connecting strips, which prevents the fixing of spur boxes to the conduit opposite the fixing devices.

SUMMARY OF THE INVENTION

The purpose of this invention therefore is to provide easy and rapid mounting of a fixing device, notably for wall fixing, for an electrical conduit, the fixing device leaving the side wall of the conduit opposite the fixing side wall clear and which is rigidly retained in a position in which it holds the conduit.

The fixing device according to the invention is characterized by the fact that the head comprises a fixed part and a component pivotably mounted on the fixed part along an axis oriented along the length of the conduit and intended to hook onto the upper wall of the conduit and that the head includes elastic locking means that exert a force parallel to the pivoting axis in order to lock the pivoting component onto the fixed part.

According to one characteristic, the locking means comprise a spring and a latch which is actuated by the spring and is automatically put into action by the pivoting of the head when the fixing device is fitted against the conduit.

According to another characteristic, the pivoting component includes, in a side wall, an asymmetric oblong void having a wide part and a narrow part so that the latch is engaged by the spring in the wide part in a locked position but not in the narrow part in an unlocked position.

BRIEF DESCRIPTION OF THE DRAWINGS

Other characteristics and advantages of the invention will emerge from the description given below that makes reference to the appended drawings.

In the appended drawings.

DESCRIPTION OF THE PREFERRED EMBODIMENTS

Figure 1:
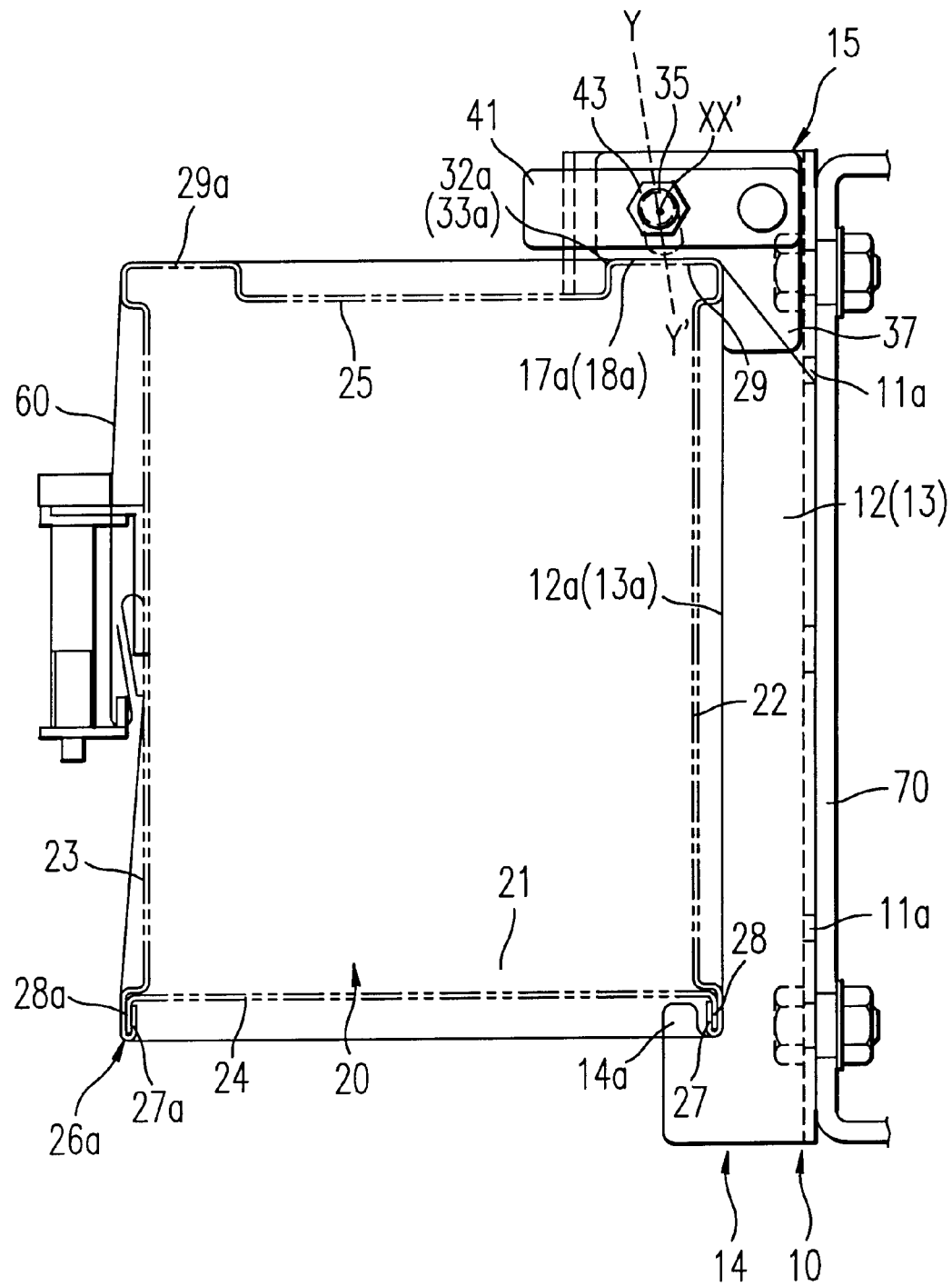
FIG. 1 is an elevation view of a fixing device according to the invention retained in the holding position on an electrical conduit.
Figure 2:
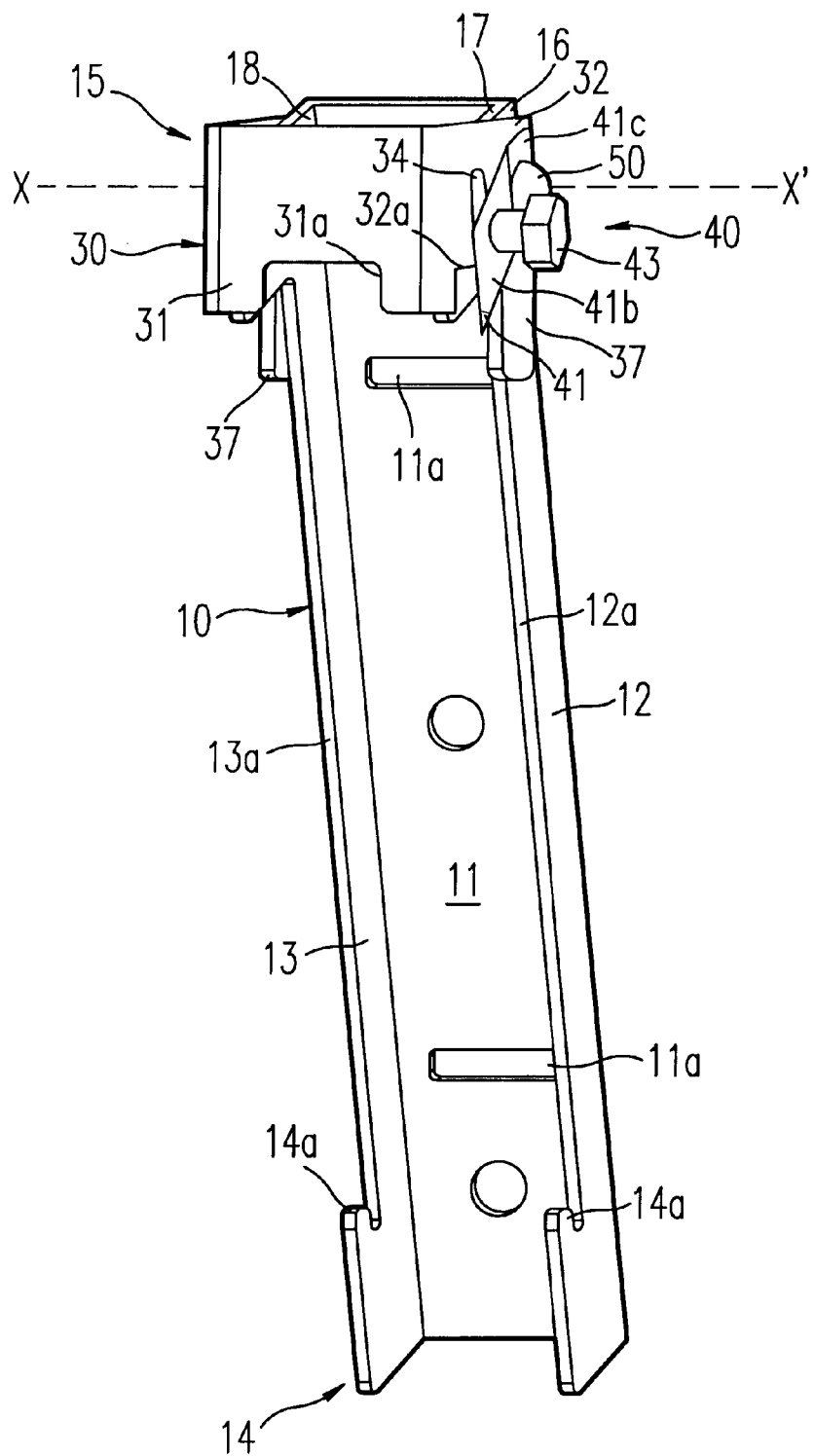
FIG. 2 is a perspective view of the fixing device.

The fixing device 10 illustrated in FIGS. 1 and 2 can be used with prefabricated electrical conduit 20 to fix the latter to a wall 70.

The electrical conduit 20 is constituted by a metal envelope 21 of rectangular or square section with four walls; side walls 22, 23, a lower wall 24 and an upper wall 25.

The conduit 20 is preferably produced by folding and by co-operation of the two sheet metal blanks in such a way that a closed shape is obtained, the first blank forming the side walls and the upper wall of the envelope and the second blank forming the lower wall. The folding is carried out to this effect with longitudinal cramping at 26 and 26a by interleaving of the free edges 27, 28 and respectively 27a, 28a of the blanks.

The upper wall 25 has, on each of its longitudinal edges a longitudinal shoulder 29, respectively 29a, to improve the rigidity of the conduit.

The fixing device 10 is designed in a way that conforms in shape to the defined shapes of the edges of the conduit.

The fixing device is shaped in profile like a C and includes a central part 11, two side members 12 and 13 arranged longitudinally on the edges of the central part, a foot 14 created in the lower part of the device and a head 15 provided in its upper part.

The device 10 is intended to be fixed onto the conduit 20, the side members 12 and 13 being capable of being applied through their edges 12a and 13a against the side wall 22 of the conduit, the foot 14 and the head 15 gripping respectively onto the lower 24 and upper 25 conduit walls.

The foot includes hooks 14a provided in extensions to the edges 12a and 13a of the side members to engage a fold in the envelope, in particular the cramped strip 26.

The head comprises a fixed part 16 and a pivoting component 30.

Figure 3:
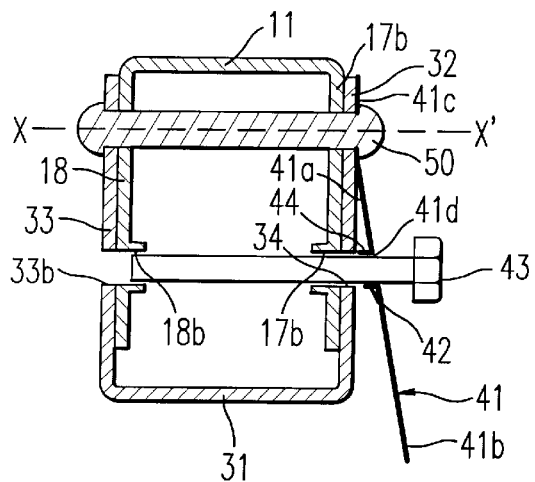
FIG. 3 is a section view from above of the fixing device in an unlocked position.
Figure 4:
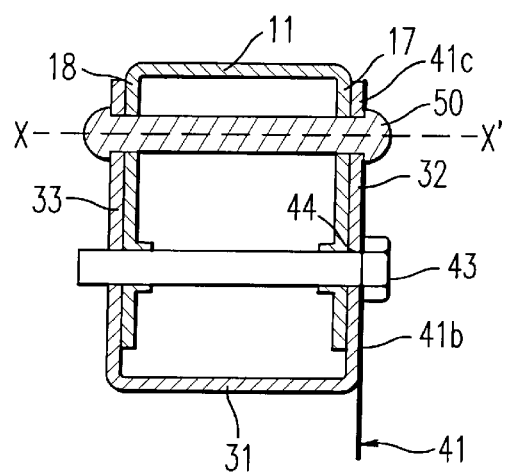
FIG. 4 illustrates the FIG. 3 fixing device in the locked position.
Figure 5:
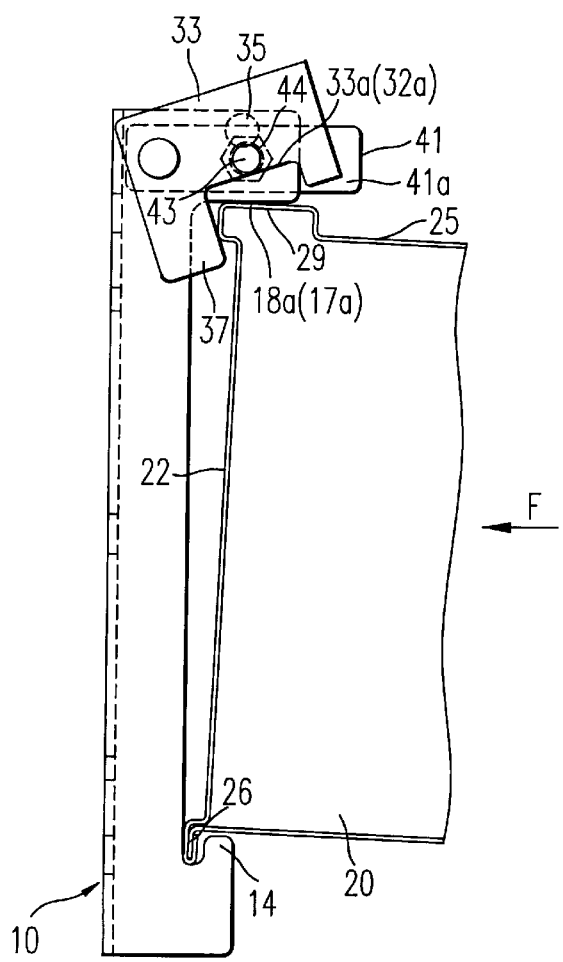
FIG. 5 is an elevation view of the fixing device and the conduit during mounting.
Figure 6:
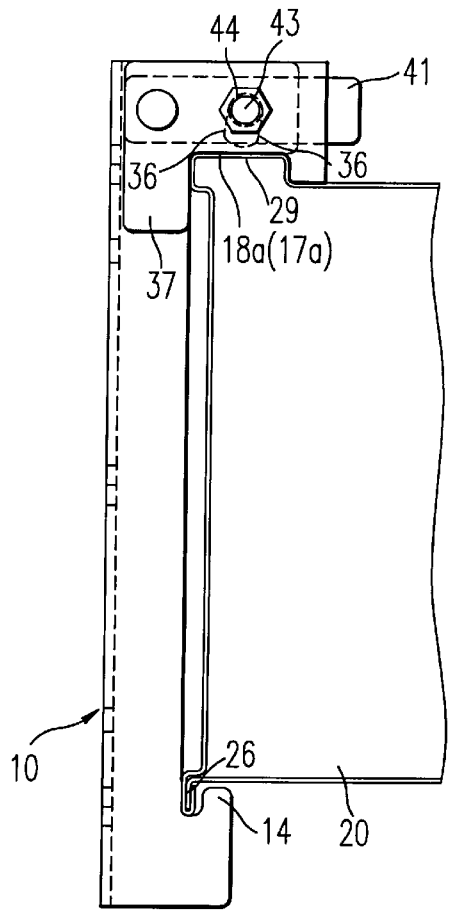
FIG. 6 is an elevation view of the fixing device once mounted on the conduit.

The fixed part 16 is made up of two side pieces 17 and 18 which extend and overhang in front of the side members 12 and 13, perpendicular to the central part 11, and are intended to be fitted by their lower respective edges 17a and 18a onto the longitudinal shoulder 29 (FIGS. 5 and 6). The side pieces 17 and 18 have respectively a threaded orifice 17b and a hole 18b (FIG. 3).

The component 30 is pivotably mounted around the side pieces 17 and 18 of the fixed part and is intended to hook onto the shoulder 29. It is retained in a position in which it holds the conduit by elastic locking means 40.

The component 30 is U-shaped and comprises a central part 31 and two wing pieces 32 and 33 facing one another joined perpendicular to the central part. It is fixed through the free ends of the wing pieces 32, 33 and is mounted so it can pivot around the upper side pieces 17, 18 of the fixed part 16 about an axis XX' perpendicular to them, thanks to mounting and pivoting means 50. These means 50 consist, for example, of a rivet that passes through matched orifices in the wing pieces 32, 33 of the pivoting component 30 and the side pieces 17, 18 of the fixed part 16.

The wing pieces 32 and 33 of the component 30 are provided on their lower edges with respective unhooking means 32a and 33a which are able to co-operate with the shoulder 29 of the envelope 21 in the position in which the pivoting component is held on the conduit in order to enable the head 15 to be hooked onto the conduit.

The component 30 also includes, on one of its wing pieces 32 an oblong void 34 whose median longitudinal axis YY' is oblique to the axis XX'. The void 34 is asymmetric perpendicular to the axis YY' and has an upper wide part 35 and a lower narrow part 36.

The component 30 has, in addition, a hole 33b in its wing piece 33 facing the hole 18b in the fixed part.

Finally, the wing pieces 32 and 33 include, at their free ends, perpendicular returns extending towards the lower part of the component. These returns are intended to press against the edge of the envelope when the fixing device 10 is hooked on, in such a way that the component 30 is made to pivot automatically.

The pivoting component 30 is locked into a position in which it holds the conduit by elastic locking means 40. These locking means include a spring 41, a latch 42 and a tightening screw 43.

The spring 41 preferably consists of a leaf spring which has two opposite flat faces 41a, 41b. The spring is fixed, at one of its ends 41c, to the wing piece 32 of the pivoting component via the rivet 50 and its face 41a is arranged facing the wing piece 32 of the pivoting component. The spring finally includes a hole 41d located in such a way as to be facing the void 34 in the pivoting component whether this is in the locked position or not.

The tightening screw 43 passes successively through the hole 41d in the spring, the void 34 in the pivoting component and the threaded orifice 17b in the fixed part. In particular, the screw 43 passes through the wide part 35 of the void 34 in the locked position in order to limit the rotation of the pivoting component and the narrow part 36 in the unlocked position in order to block movement of the pivoting component.

The latch 42 includes a ratchet device which is actuated by the pushing action of the spring 41 against the pivoting component at the narrow part 36 in the unlocked position for the pivoting component and is intended to co-operate by ratcheting with the wide part 35 in the locked position.

The ratchet device preferably consists of an annular shoulder provided around the periphery of the hole 41d in the spring and jutting out in relation to the face 41a of the spring.

It is possible to reinforce the security of the fixing of the device 10 onto the conduit by completely encompassing the conduit with a metal strap 60. The strap is passed into the fixing device, successively, through two voids 11a provided in the central part 11 in the device 10, through the free space between the central part 11 of the device 10 and the central part 31 of the pivoting component and finally through a void 31a in the central part. The strap can then surround the conduit and then be attached by an appropriate device.

Mounting of the fixing device to the conduit will now be described.

In fact, the fixing devices 10 are fixed first of all to the wall 70 against which the conduit 20 must be mounted. Each fixing device 10 is fixed through its central part 11 (FIG. 1).

Before mounting the conduit to a fixing device 10, the pivoting component 30 is in the unlocked position. Hence the tightening screw 43 passes through the leaf of the spring 41, the wing piece 32 of the pivoting component and the side piece 17 on the fixed part 16 through the hole 41d, the narrow part 36 of the void 34 and respectively the threaded orifice 17b. The annular shoulder 44 of the leaf of the spring 41 presses partially in abutment against the wing piece 32 of the component 30 and is partially engaged in the narrow part 36.

On mounting, the conduit 20 is engaged into the foot 14 in such a way that the hooks 14a hook on behind the cramped strip 26. The conduit is tilted towards the device 10 in the direction of the arrow F (FIG. 5), the edges of the returns 37 of the pivoting component then resting against the top edge of the side wall 22. Then a force is exerted on the conduit again directed in the direction of the arrow F, which presses on the returns to cause the component to pivot automatically downwards in such a way that the unhooking means 32a, 33a grip the shoulder 29 of the upper wall 25 of the conduit.

The pivoting of component 30 causes the rotation of the void 34 in relation to the axis of the screw 43 in such a way that the wide part 35 is located in the previous position of the narrow part 36. The screw 43 which remains engaged in the threaded orifice 17b and the hole 41d, then passes through the wide part 35. The annular shoulder 44 is ratcheted into the wide part 35. The pivoting component 30 is therefore locked. To confirm that it is locked, the screw 43 is advantageously tightened up in such a way that it passes through the opposite wing piece 33 of the pivoting component and the side piece 18 of the fixed part via the respective holes 33b and 18b.

In order to release the conduit 20 from the fixing device 10, the screw 43 is unscrewed so as to remove it from holes 18b and 33b. The leaf of the spring 41 and the wing piece 32 of the pivoting component are moved apart in order to disengage the annular shoulder 44 from the wide part 35. Then the component 30 is pivoted upwards in such a way that the shoulder 44 is repositioned in abutment against the narrow part 36, the component 30 then being unlocked. Afterwards the conduit is simply pulled in the opposite direction to the arrow F and the hooks 14a are lifted off.

The metal strap 60 can be used for part of the conduit assembly for certain fixing devices so as to allow free access to sufficiently large areas of the side wall 23. The metal strap must be slid through the voids 11a in the central part 11 before fixing the device 10 to the wall 70.

We claim:

1. A fixing device for a profiled electrical conduit having a longitudinal axis, comprising:

a central part, a head and a foot respectively adapted to be fitted against a side wall and upper and lower walls of the conduit, wherein the head comprises a fixed part and a pivoting component pivotably mounted on the fixed part along the longitudinal axis of the conduit and connectable to the upper wall of the conduit;

the head comprises an elastic locking mechanism exerting a force parallel to the longitudinal axis in order to lock the pivoting component onto the fixed part wherein the locking mechanism comprises a spring and a latch which is actuated by the spring and is automatically put into action by pivoting of the head when the fixing device is fitted against the conduit and wherein the pivoting component includes in a side wall thereof an oblong asymmetric aperture having a wide part and a narrow part such that said latch is engaged by the spring in the wide part in a locked position but not in the narrow part in an unlocked position.

2. The fixing device according to claim 1, wherein the locking mechanism comprises a tightening screw which freely enters the oblong void and into a threaded orifice in the fixed part in order to respectively limit the rotation of the pivoting component in the unlocked position and block movement thereof in the locked position.

3. The fixing device according to claim 1, wherein the latch comprises a ratchet drive which presses against the pivoting component at the edge of the narrow part of the oblong void in the unlocked position and is engaged in the wide part of the oblong void in the locked position.

4. The fixing device according to claim 3, wherein the spring is a leaf spring fixed at one end hereof to the pivoting component which has a hole for passage of the screw and that the ratchet device comprises an annular shoulder which is arranged so as to protrude around the hole in the leaf of the spring facing the pivoting component.

5. A fixing device for a profiled electronic conduit having a longitudinal axis, comprising:

a central part: a head and a foot respectively adapted to be fitted against a side wall and upper and lower walls of the conduit wherein the head comprises a fixed part and a pivoting component pivotally mountable on the fixed part along the longitudinal axis of the conduit and connectable to the upper wall of the conduit, the head comprising an elastic locking mechanism exerting a force parallel to the axis in order to lock the pivoting component onto the fixed part wherein the foot of the fixing device comprises at least one hook adapted to provide co-operation with a fold in an envelope of the conduit, and the head comprises at least one unhooking device adapted to provide co-operation with a shoulder in the envelope of the conduit, while the pivoting component includes at least one return member adapted to press against an edge of the envelope during mounting in order for the component to pivot automatically.

6. A fixing device for a profiled electrical conduit having a longitudinal axis and a shoulder, comprising:

a central part, a head located at a first end of said central part and a foot located at an opposite end of said central part respectively adapted to be fitted against a side wall and upper and lower walls of the conduit, wherein the head comprises a fixed part and a pivoting component pivotably mountable on the fixed part along the longitudinal axis of the conduit and engageable with said shoulder of said conduit;

the head comprises an elastic locking mechanism exerting a force parallel to the longitudinal axis in order to lock the pivoting component onto the fixed part.

7. The fixing device according to claim 6, wherein the locking mechanism comprises a spring and a latch which is actuated by the spring and is automatically put into action by pivoting of the head when the fixing device is adapted to be fitted against the conduit.

8. The fixing device according to claim 7, wherein the pivoting component includes in a side wall thereof an oblong asymmetric aperture having a wide part and a narrow part such that said latch is engaged by the spring in the wide part in a locked position but not in the narrow part in an unlocked position.

9. The fixing device according to claim 8, wherein the locking mechanism comprises a tightening screw which freely enters the oblong void and a threaded orifice in the fixed part in order to respectively limit the rotation of the pivoting component in the unlocked position and block movement thereof in the locked position.

10. The fixing device according to claims 8, or 9, wherein the latch comprises a ratchet device which presses against the pivoting component at the edge of the narrow part of the oblong void in the unlocked position and is engaged in the wide part of the oblong void in the locked position.

11. The fixing device according to claim 10, wherein the spring is a leaf spring fixed at one end thereof to the pivoting component which has a hole for passage of the screw and that the ratchet device consists of an annular shoulder which is arranged so as to protrude around the hole in the leaf of the spring facing the pivoting component.

12. The fixing device according to claim 6, wherein the foot of the fixing device comprises at least one hook adapted to provide co-operation with a fold in an envelope of the conduit, and the head comprises at least one unhooking device provided to co-operate with a shoulder in the envelope of the conduit, while the pivoting component includes at least one return member to press against an edge of the envelope during mounting in order for the pivoting component to pivot automatically.

* * * * *